3,034,949
FUNGICIDAL COMPOSITION COMPRISING CHLOROPHENOL MERCURY SULFATE AND TETRAMETHYLTHIURAM DISULFIDE
Truman C. Ryker, Wilmington, Del., assignor to E. I. du Pont de Nemours and Company, Wilmington, Del., a corporation of Delaware
No Drawing. Filed Oct. 12, 1959, Ser. No. 845,667
1 Claim. (Cl. 167—22)

This invention relates to substantially anhydrous fungicidal compositions and methods utilizing a substantially anhydrous mixture of a fungicidal tetraalkylthiuram sulfide with a fungicidally active phenyl mercury compound.

A wide variety of dithocarbamic acid derivative compounds and organic mercury compounds are known to possess fungicidal activity. It has furthermore been known to apply a combination of these fungicidally active compounds simultaneously in the control of fungus diseases. However, in the prior art, this simultaneous treatment has always been done by admixing the two materials in an aqueous system immediately prior to application to the area to be treated. This has required separate packaging, separate mixing, loss of time, additional handling of toxicants, etc., in the preparation of the spraying solution.

The reason why fungicidal dithiocarbamic acid derivative compounds and organic mercury compounds have not been combined together in a dry composition is their notorious instability when together.

It has now unexpectedly been found according to this invention that one or more of a narrow class of dithiocarbamic acid derivative compounds, namely, the tetraalkylthiuram sulfides from the group consisting of tetramethylthiuram monosulfide, tetramethylthiuram disulfide, tetraethylthiuram monosulfide and tetraethylthiuram disulfide, can be admixed in a substantially anhydrous composition with one or more narrow class of fungicidally active organic mercury compounds, namely, phenyl mercury compounds selected from the group of compounds having the formula:

(1) 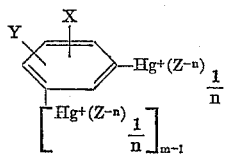

wherein X is selected from the group consisting of hydrogen, chlorine, bromine, hydroxyl, nitro, and lower alkyl having 1–3 carbons; Y is selected from the group consisting of hydrogen, chlorine, bromine, and hydroxyl; $m$ is a whole number of less than 3, namely 1 or 2, $n$ is a whole number of less than 4; and Z is a negative radical selected from the group consisting of halide, acetate, propionate, lactate, carbonate, hydroxyl, sulfate, and phosphate.

Mixtures of these two groups of compounds prepared according to this invention have been held for four years without deterioration, loss of fungicidal properties, evolution of noxious odors, or visible discoloration, whereas representative combinations of dithiocarbamic acid derivative fungicides with organomercury fungicides outside the scope of the present invention, particularly the alkyl mercury compounds, rapidly decompose and their fungitoxic efficiency is greatly reduced with the concurrent release of highly objectionable odors and fumes.

Illustrative of the phenyl mercury compounds within the scope of this invention can be listed the following:

Phenyl mercury acetate
Phenyl mercury sulfate
Phenyl mercury chloride
Phenyl mercury carbonate
Phenyl mercury phosphate
Phenyl mercury propionate
Phenyl mercury lactate
p-Tolylmercury chloride
Chloro mercury phenol (phenol mercury chloride)
4-mercury chlorophenol sulfate (chlorophenol mercury sulfate)
2,4-dimercury chlorophenol sulfate
2,4-dimercury chlorophenol chloride
2,4-dimercury chlorophenol acetate
4-mercury chlorophenol acetate (chlorophenol mercury acetate)
4-mercury nitrophenol sulfate
2,4-dichlorophenyl mercury sulfate
4-mercury bromophenol sulfate
N,N-bis-phenylmercury ammonium propionate These mercury compounds can be prepared, for example, in accordance with the teachings of U.S. Patent 1,618,370.

These phenyl mercury derivatives have small water solubilities, ranging up to about 4.0% at 20° C.

If the solubility of the phenyl mercury compound is very small, for example, if less than 0.1 gram dissolves in 100 grams of water at 20° C., it is preferred to add to the substantially anhydrous fungicidal compositions of this invention, as an additional ingredient, a solid water-soluble inorganic base selected from the group consisting of sodium hydroxide, calcium hydroxide, calcium oxide, potassium hydroxide, sodium carbonate, and potassium carbonate. By water-soluble is meant a solubility in water of at least 0.1% at 20° C. It will be noted that the effect of the inorganic base will be to neutralize the phenyl mercury compound and thus render it more soluble in water. The base should be of a solubility greater than the phenyl mercury compound.

Compositions of this invention containing the two fungicidally active types of compounds are characterized by synergistic fungicidal activity when compared with compositions containing only one of the fungicidally active compounds. The compositions are especially useful for the treatment of turf and of certain fruit trees.

The compositions of this invention can also contain, in addition to the three components referred to above, solid adjuvants, such as diluents, anti-foaming agents, anti-dusting agents, desiccants, dyes, wetting and dispersing agents, etc. Plant nutrients or fertilizers, such as urea, soluble iron, and the trace elements manganese, zinc, copper, boron, and molybdenum in the oxide form can also be included.

When an inorganic base is included, it should preferably be present in at least a molar equivalent amount with respect to the phenyl mercury compound. The upper limit of the molar equivalent ratio is not considered to be particularly critical, and in general satisfactory compositions are obtained when the phenyl mercury compound to inorganic base molar equivalent ratio is within the range from 1:1 to 1:40. Particularly advantageous compositions are obtained within the range from 1:10 to 1:30. Greatly preferred compositions have molar equivalent ratios within the range from 1:15 to 1:20.

In the compositions of this invention, the tetraalkylthiuram sulfide compound should be present in an amount by weight at least equal to the phenyl mercury compound. The compositions can contain as much as 10 parts by weight of the tetraalkylthiuram sulfide for each one part by weight of the phenyl mercury compound, and for some uses, as in fruit tree sprays, can contain 30 times as much of the tetraalkylthiuram sulfides by weight as the aryl mercury compounds.

The compositions of this invention, comprising one or more of the phenyl mercury derivatives in admixture with one or more of the bis-alkylthiuram sulfides, should be substantially anhydrous. By "substantially anhydrous" it is meant that the water content should not exceed 5.0%, by weight, of the total. Compositions having less than 2.0%, by weight, of water are preferred. For greatest stability, the compositions should be anhydrous. It may be advantageous to maintain the compositions in an anhydrous state by including a desiccant such as calcium oxide, silica gel, or anhydrous sodium sulfate in the formulation. The low water content avoids problems of caking and loss of flowability ("setting up," hardening) and is important to give to the mixture its stability.

In practicing the fungicidal methods of this invention, the novel compositions containing the essential ingredients are applied to the organic material to be treated for the control of fungi at a dosage sufficient to exert fungicidal action. They are particularly suitable for the treating of plants such as seeds, vegetables, ornamental plants and fruit-bearing trees such as apple and pear. Some of these compositions are also effective when applied directly to the soil for controlling plant fungi. Also they can be used to treat organic fibers and fabrics and various cellulosic materials such as leather and wood. Likewise they can be used to treat paints and lubricating oils.

In a particular preferred use, the compositions of this invention are applied as a turf fungicide to lawn type grasses for the control of such fungus diseases as dollar spot (*Sclerotinia homococarpa*), brown patch (*Pellicularia filamentosa*), snow mold (*Fusarium nivali*), copper spot (*Gleocercospora sorghi*), and blight caused by Helminthosporium spp. Such treatment is particularly advantageous for fungus control of golf course turf.

In application, fungicidal control is obtained in most instances by applying the ingredients of the substantially anhydrous compositions of this invention at a dosage or rate from about 1 to 100 pounds per acre, the optimum amount within this range being largely dependent upon the variables mentioned heretofore. In application directly to lawn grasses as a turf fungicide, in most instances the dosage or rate is from about 3 to 40 pounds per acre. The optimum dosage can be determined in each instance by one of the means conventional in the art. It is, of course, dependent upon the particular fungicidal formula selected, the method of application, the climatic conditions, and, in the case of application to vegetation, the state and condition of growth of the vegetation to be treated.

Certain of the compositions can also be utilized for the simultaneous control of fungi and eradication of crab grass in lawns. The combination of phenyl mercury derivatives (here also acting as a crab grass killer) with tetraalkylthiuram sulfide derivatives in a turf fungicide composition is especially attractive to a homeowner because of its ease of application.

The fungicidal compositions of this invention contain, in sufficient amount together to exert fungicidal action, one or more of the above-named tetraalkylthiuram sulfide compounds in admixture with one or more of the above-described phenyl mercury compounds of the Formula 1. Preferred compositions also contain a water-soluble solid inorganic base compound, as described above, as a third component. These ingredients can be combined in admixture with a solid carrier material or conditioning agent of the kind used and commonly referred to in the art as a fungicide adjuvant or modifier. The conventional fungicide adjuvants useful in this invention are, as stated above, inert solids, wetting and dispersing agents, protective colloids, anti-foaming agents, anti-dusting agents, and coloring agents. They provide suitable solid dry formulations adapted for ready and efficient application using conventional applicator equipment. Usually from about 1% to about 95% by weight of the total fungicidal composition will be composed of the essential fungicidal ingredients.

The solid compositions of this invention are preferably in the form of substantially anhydrous wettable powders. They are compounded as homogeneous powders that can either be used as such, diluted with inert solids to form dusts, or subsequently suspended in a suitable liquid medium for spray application. The powder is usually comprised of the essential ingredients referred to above admixed with minor amounts of conditioning agents or diluents. Natural absorptive clays such as attapulgite, relatively nonabsorptive clays such as kaolin, or materials such as diatomaceous earth, walnut shell flour, tobacco dust, redwood flour, synthetic fine silica, calcium silicate, and other inert solid carriers of the kind conventionally employed in powder fungicidal compositions, can be used as diluents. The fungicidal ingredients, together with the inorganic base, if the latter is to be used, usually make up from about 5% to about 90% of these powdered compositions.

For conversion of the powders to dusts or granule compositions, talc, pyrophyllite, tobacco dust, volcanic ash, and other dense, rapid-settling inert solids are customarily used. In the dust compositions of this invention, the essential fungicidal ingredients usually make up from about 1% to about 10% by weight of these compositions.

When the substantially anhydrous compositions are to be used in the form of wettable powders, they can also include one or more surface-active agents such as wetting, dispersing, or emulsifying agents. These materials cause the compositions to wet and disperse easily in water to give aqueous sprays. The wettable powders can be conveniently diluted with water at a rate of 1 to 20, and preferably 2 to 10 pounds of powder per 100 gallons of water.

The surface-active agents employed can be of the anionic, cationic, or nonionic type. They include, for example, sodium oleate, sulfonated petroleum oils, alkyl aryl sulfonates, sodium lauryl sulfate, polyethylene oxides, lignin sulfonates, and other surface-active agents. A detailed list of such agents is set forth in an article by McCutcheon in "Soap and Chemical Specialties," December 1957; January, February, March, April, 1958. Care must be taken, however, that the surfactants are compatible with the fungicidal ingredients.

Other conditioning agents that can be used with these compositions include protective colloids (or gums) such as casein, Methocel, and hydroxyethylcellulose. Where powders are to be relatively nondusty and yet rapidly wettable and dispersible in water, glycols or paraffinic oils can be used in the compositions. Dyes or antifoam agents can also be added.

Where it is desired to incorporate nutrients or fertilizers into the fungicidal compositions, such nutrients and fertilizers can serve in part as the carrier. For example, fungicidal ingredients can be mixed with urea, other fertilizers, soluble iron, mineral trace elements, or the like and converted to dusts, granules, or wettable powders as described above.

The tetraalkylthiuram sulfides can be prepared conveniently, for example, according to the processes disclosed in U.S. Patents Nos. 2,751,415, 2,751,416, and 2,777,878.

Use of the novel dry formulations of this invention, contribute outstandingly to the ease of handling and efficiency of application of the fungicidal ingredients.

In order that the invention may be better understood, the following examples are given in addition to those already set forth above:

*Example 1*

| | Parts by weight |
|---|---|
| Chlorophenol mercury sulfate | 11.4 |
| Tetramethylthiuram disulfide | 45.0 |
| Hydrated lime | 13.9 |
| Sodium carbonate | 13.2 |
| Kaolinite | 12.0 |
| Casein | .7 |
| Sodium lignin sulfonate | 1.2 |
| Sodium alkyl aryl sulfonate | 1.0 |
| Green Lake | 1.0 |
| Ethylene glycol | .6 |

These ingredients are well blended and then ground in a hammer mill to a small particle size substantially less than 50 microns. The composition is then stored for a period of 4 years in a closed fiber board container under ordinary conditions. The fungitoxic efficiency of the composition is evaluated by means of the standard agar plate technique. Weighed amounts of the composition are mixed thoroughly with liquid malt extract agar to give concentrations of the composition which range from 0.2% to 0.008%. The agar plus chemical mixture is placed in Petri dishes. After the agar hardens it is inoculated with four different fungi to determine the inhibiting concentration of the composition against each fungus. The fungi are selected on the basis of their importance in turf disease problems and ubiquity on organic materials. The agar is inoculated by seeding it with a loopful of a suspension of spores and hyphae, and the plates then incubated at 82° F. for 6 days.

Growth of three of the fungi (*Fusarium nivale*, *Helminthosporium sativum*, and *Gibberella saubinetti*) is completely inhibited at 0.0008% of the product in Example 1. Growth of *Aspergillus terreus* is inhibited at 0.0125%. On untreated potato dextrose agar all four fungi grow profusely.

*Example 2*

The fresh sample of the composition described in Example 1 is prepared and evaluated for biological efficiency as described in Example 1. Results are identical except that growth of *Aspergillus terreus* is inhibited also at 0.00625%.

These results, taken with those of Example 1, show that the fungicidal effectiveness of the composition is essentially unchanged even after the four-year storage period.

*Example 3*

| | Parts by weight |
|---|---|
| Chlorophenol mercury sulfate | 11.4 |
| Tetramethylthiuram disulfide | 45.0 |
| Hydrated lime | 10.0 |
| Sodium carbonate | 16.3 |
| Kaolinite | 12.4 |
| Casein | .8 |
| Sodium lignin sulfonate | 1.2 |
| Sodium alkyl aryl sulfonate | 1.1 |
| Green Lake | 1.2 |
| Ethylene glycol | .6 |

This composition is prepared and evaluated for fungitoxic efficiency as described in Examples 1 and 2. The results are identical to those described in Example 2.

*Example 4*

The fungicidal effectiveness of the composition of Example 3 is compared with two other similar compositions, one containing chlorophenol mercury sulfate as the only active fungicidal ingredient and the other containing tetramethylthiuram disulfide as the only active fungicidal ingredient. The results of the test are as follows:

| Composition | Percent Required to Inhibit Growth of *Aspergillus terreus* | | Percent Required to Inhibit Growth of *Helminthosporium sativum*, *Fusarium nivale*, and *Gibberella saubinetti* | |
|---|---|---|---|---|
| | Phenyl Mercury Content | Tetramethylthiuram disulfide Content | Phenyl Mercury Content | Tetramethylthiuram disulfide Content |
| Composition of Example 3, containing both a phenyl mercury compound and tetramethylthiuram disulfide | 0.00071 | 0.0028 | <0.00009 | <0.00035 |
| Composition containing phenyl mercury compound | 0.013 | | 0.0033 | |
| Composition containing tetramethylthiuram disulfide | | 0.00468 | | 0.00234 |

These results show that the anhydrous composition of Example 3 provides synergistic fungitoxic action when compared to the fungitoxic efficiency of the individual components (tetramethylthiuram disulfide and chlorophenol mercury sulfate).

*Example 5*

| | Percent |
|---|---|
| 2,4-Dimercury chlorophenol acetate | 5 |
| Tetramethylthiuarm monosulfide | 45 |
| Hydrated lime | 14 |
| Sodium carbonate | 14 |
| Kaolinite | 20 |
| Sodium lignin sulfonate | 1 |
| Sodium alkyl aryl sulfonate | 1 |

The above materials are well blended and then ground in a hammer mill until the particle size is substantially less than 50 microns.

The composition is mixed with water in a spray tank at 3 ounces of composition per 5 gallons of water. When sprayed on bent grass at the rate of 5 gallons of formulation per 1000 square feet of turf on a schedule of every 7 days throughout the season, the composition is found to control dollar spot (*Sclerotinia homeoscarpa*).

*Example 6*

| | Percent |
|---|---|
| Chlorophenol mercury acetate | 12 |
| Tetraethylthiuram disulfide | 12 |
| Sodium carbonate | 2 |
| Kaolinite | 72 |
| Sodium lignin sulfonate | 1 |
| Sodium alkyl aryl sulfonate | 1 |

The above materials are well blended and then ground in a hammer mill until the particle size is substantially below 50 microns.

The composition is mixed with water in a spray tank at 5 ounces of composition per 5 gallons of water. When sprayed on blue grass at the rate of 5 gallons of formulation per 1000 square feet of turf, the composition is found to control brown patch (*Pellicularia filamentosa*).

*Example 7*

| | Percent |
|---|---|
| 2,4-dimercury chlorophenol sulfate | 7 |
| Tetraethylthiuram monosulfide | 70 |
| Sodium carbonate | 7 |
| Kaolinite | 15 |
| Sodium lignin sulfonate | 1 |

These materials are prepared into a fungicidal spray as described in Example 5. When applied to fescue grass at the rates and schedules described in Example 5, the composition is found to control blight caused by *Helminthosporium* spp.

When prepared, formulated, and applied to fescue grass as in Example 5, the composition is also found to control copper spot (*Gleocercospora sorghi*).

*Example 8*

| | Percent |
|---|---|
| Phenyl mercury sulfate | 10 |
| Tetramethylthiuram disulfide | 45 |
| Hydrated lime | 7 |
| Sodium carbonate | 7 |
| Kaolinite | 29 |
| Sodium lignin sulfonate | 1 |
| Sodium alkyl aryl sulfonate | 1 |

These materials are prepared into a fungicidal spray as described in Example 6. When applied to a mixture of blue, fescue, and bent grasses at the rates described in Example 6, the composition is found to control snow mold (*Fusarium nivali*).

*Example 9*

| | Percent |
|---|---|
| Phenyl mercury acetate | 10.4 |
| Tetramethylthiuram disulfide | 45.5 |
| Kaolinite | 38.0 |
| Green Lake | 1.2 |
| Casein | 0.8 |
| Hodag HC 303 antifoam | 1.2 |
| "Goulac" (partially desulfonated ligno sulfonate) | 1.2 |
| Sodium alkyl aryl sulfonate | 1.1 |
| Ethylene glycol | 0.6 |

The above materials are blended and then ground in a hammer mill until the particle size is substantially below 50 microns. The moisture content of the mixture is maintained below about 1%.

This composition is mixed with water in a spray tank at a rate of 3 ounces per 100 gallons of water. The resulting suspension is sprayed on apple trees that have been infected during the previous 72 hours or less with the apple scab fungus *Venturi inaequalis*. Apple scab does not develop on the trees sprayed with this suspension, whereas similar adjoining unsprayed trees become heavily diseased. The composition of this example is found to have the advantage, over phenyl mercury acetate applied alone, of causing no damage to the apple trees. The phenyl mercury acetate used alone causes leaf fall under some circumstances and reduces the percentage of fruit set.

*Example 10*

| | Percent |
|---|---|
| Phenyl mercury acetate | 10.4 |
| Tetramethylthiuram disulfide | 46.2 |
| Calcium hydroxide | 10.6 |
| Casein | .8 |
| Green Lake | 1.2 |
| Sodium carbonate | 15.9 |
| Hodag HC 303 antifoam | 1.2 |
| Kaolinite | 11.2 |
| "Goulac" (partially desulfonated ligno sulfonate) | 1.2 |
| Sodium alkyl aryl sulfonate | 1.1 |
| Ethylene glycol | 0.6 |

The above materials are well blended and then ground in a hammer mill (taking care to keep the material substantially anhydrous), until the particle size is substantially less than 50 microns.

The mixture is an excellent turf fungicide and can be used in a manner similar to the formulations of Examples 5 and 6.

*Example 11*

| | Percent |
|---|---|
| Chlorophenol mercury sulfate | 11.6 |
| Tetramethylthiuram disulfide | 46.2 |
| Kaolinite | 36.5 |
| Sodium alkyl aryl sulfonate | .8 |
| Casein | .8 |
| Green Lake | 1.1 |
| Hodag HC 303 antifoam agent | 1.2 |
| "Goulac" (partially desulfonated ligno sulfonate) | 1.2 |
| Ethylene glycol | 0.6 |

The above materials are well blended and then ground in a hammer mill until the particle size is substantially less than 50 microns.

The product is applied as a fungicidal spray, using 5 ounces of the composition in a gallon of water and applying it to an area of 1000 sq. ft. of lawn. Considerably higher amounts, say as much as 25 ounces per 1000 sq. ft., can usually be applied without damage to the lawn.

*Example 12*

| | Percent |
|---|---|
| Phenylmercury lactate | 2.2 |
| Tetramethylthiuram disulfide | 65.0 |
| Hydrated lime | 13.0 |
| Sodium carbonate | 13.0 |
| "Goulac" (partially desulfonated ligno sulfonate) | 2.0 |
| Sodium alkyl aryl sulfonate | .5 |
| Ethylene glycol | 1.0 |
| Kaolinite | 3.3 |

These materials are well blended and then ground in a hammer mill until the particle size is substantially less than 50 microns.

The above composition is mixed with water at the rate of 1 pound per 100 gallons. Apple trees that have become infected with the apple scab fungus, *Venturia inaequalis*, during the previous 72 hours or less are sprayed with the resulting suspension. The incipient apple scab is killed out by the application. In addition, the trees are protected from further infection by this fungus for a period of 7–14 days without any injury to the trees. Spraying of phenyl mercury compounds alone at the same metallic mercury level as in the combination also eradicates the incipient disease, but causes many leaves on the trees to fall and, in addition, fails to provide protection from subsequent infection. Thiuram used alone will provide protection after application but does not eliminate incipient infection up to 72 hours old as does the composition of this example.

*Example 13*

| | Percent |
|---|---|
| Phenylmercury propionate | 5.8 |
| Tetramethylthiuram disulfide | 50.5 |
| Calcium oxide | 5.0 |
| Sodium carbonate | 16.0 |
| "Qoulac" (partially desulfonated ligno sulfonate) | 2.0 |
| Sodium alkyl aryl sulfonate | 0.5 |
| Kaolinite | 20.2 |

The above materials are well blended and then ground in a hammer mill until the particle size is substantially less than 50 microns. Care is taken to maintain the moisture content below 1%; any small amounts of moisture present are absorbed by reaction with the unslaked lime (CaO) present in the mixture. The mixture can be applied to turf, for example, at the rate of 1 to 4 ounces per 1000 square feet. This quantity can usually be applied in from 3 to 15 gallons of water. The mixture will control turf diseases such as dollar spot, brown patch, copper spot, and is also effective to destroy crab grasses (*Digitaria ischaemum*, *Digitaria sanguinalis*, or the like) growing among the desirable turf grasses.

Example 14

| | Percent |
|---|---|
| Chlorophenol mercury sulfate | 8.7 |
| Tetramethylthiuram disulfide | 34.6 |
| Urea | 25.0 |
| CaO | 7.5 |
| Sodium carbonate | 11.5 |
| Kaolinite | 7.77 |
| Alkyl naphthalene sodium sulfonate | 1.0 |
| Sodium lignin sulfonates | 0.9 |
| Hodag 303 antifoam | 0.9 |
| Green Lake | 0.9 |
| Ethylene glycol | 0.45 |
| Zinc sulfate | 0.04 |
| Cupric chloride | 0.06 |
| Manganese chloride | 0.10 |
| Borax | 0.02 |
| Molybdenum oxide | 0.02 |
| Magnesium sulfate | 0.50 |
| Ferric sulfate | 0.04 |

The ingredients are blended in ribbon blender until the mixture is uniform. The powder is then passed twice through a micropulverizer. The product is a light-green powder that can easily be slurried in water for application to turf, for example, at a rate of 4 ounces per 1000 square feet. The mixture is an effective turf fungicide, which in addition also stimulates the growth of lawn grasses by supplying to the plants a fertilizer and mixed trace elements that make up for partial deficiencies that often exist in many soils.

This application is a continuation-in-part of Serial Number 735,943, filed May 19, 1958, now abandoned.

The invention claimed is:

A fungicidal composition comprising from 10 to 15 parts by weight of chlorophenol mercury sulfate and from 40 to 50 parts by weight of tetramethylthiuram disulfide, said composition containing no more than 2% moisture.

References Cited in the file of this patent

Frear: A Catalogue of Insecticides and Fungicides, 1948, Chronica Botanica Comp., vol. II, pp. 51, 53–55.

Frear: Chemistry of the Pesticides, 3rd ed., 1955 D. Van Nostrand, pp. 294–301, 358, 359.